US010762702B1

(12) United States Patent
Dhua et al.

(10) Patent No.: US 10,762,702 B1
(45) Date of Patent: Sep. 1, 2020

(54) RENDERING THREE-DIMENSIONAL MODELS ON MOBILE DEVICES

(71) Applicant: A9.com, Inc., Palo Alto, CA (US)

(72) Inventors: Arnab Dhua, Mountain View, CA (US); Xing Zhang, Sunnyvale, CA (US); Karl Hillesland, San Carlos, CA (US); Himanshu Arora, San Jose, CA (US); Nicholas Corso, Seattle, WA (US); Brian Graham, Palo Alto, CA (US); Jesse Chang, Granada Hills, CA (US); Jason Canada, San Francisco, CA (US)

(73) Assignee: A9.com, Inc., Palo Alto, CA (US)

( * ) Notice: Subject to any disclaimer, the term of this patent is extended or adjusted under 35 U.S.C. 154(b) by 0 days.

(21) Appl. No.: 16/015,997

(22) Filed: Jun. 22, 2018

(51) Int. Cl.
*G06T 17/20* (2006.01)
*G06T 15/20* (2011.01)
*G06T 19/00* (2011.01)

(52) U.S. Cl.
CPC ............ *G06T 17/20* (2013.01); *G06T 15/205* (2013.01); *G06T 19/006* (2013.01); *G06T 2200/08* (2013.01)

(58) Field of Classification Search
None
See application file for complete search history.

(56) References Cited

U.S. PATENT DOCUMENTS

| 6,356,272 | B1* | 3/2002 | Matsumoto | G06T 15/04 345/582 |
| 6,518,963 | B1* | 2/2003 | Waupotitsch | G06T 11/001 345/419 |
| 8,890,936 | B2* | 11/2014 | Sharma | H04N 13/239 348/46 |
| 9,240,077 | B1* | 1/2016 | Kraft | G06T 19/006 |
| 9,569,679 | B1* | 2/2017 | Gray | H04N 1/38 |
| 9,911,237 | B1* | 3/2018 | Gray | G06F 16/5838 |
| 10,621,751 | B2* | 4/2020 | Yang | G06T 7/75 |
| 2002/0085748 | A1* | 7/2002 | Baumberg | G06T 15/04 382/154 |
| 2005/0151751 | A1* | 7/2005 | Hong | G06T 15/04 345/582 |
| 2007/0296721 | A1* | 12/2007 | Chang | H04N 13/359 345/427 |
| 2008/0225045 | A1* | 9/2008 | Birtwistle | G06T 7/55 345/420 |
| 2011/0050864 | A1* | 3/2011 | Bond | H04N 13/305 348/51 |

(Continued)

*Primary Examiner* — Hilina K Demeter
(74) *Attorney, Agent, or Firm* — Hogan Lovells US LLP

(57) ABSTRACT

A complex three-dimensional virtual representation of an object can be rendered. Virtual images can be captured representing a plurality of views of the complex virtual representation. The virtual images can be converted into binary masks depicting the object pixels and non-object pixels in the virtual images. The binary masks can be used to create a three-dimensional representation of the object having lower complexity than the first three-dimensional virtual representation of the object. In embodiments, the low complexity three-dimensional virtual representation of the object and the virtual images are sent to a mobile device to render a low payload representation of the object on the mobile device.

19 Claims, 10 Drawing Sheets

(56) References Cited

U.S. PATENT DOCUMENTS

| | | | |
|---|---|---|---|
| 2011/0292034 A1* | 12/2011 | Corazza | G06T 13/40 345/419 |
| 2012/0238871 A1* | 9/2012 | Pfister | A61B 6/4458 600/431 |
| 2014/0029788 A1* | 1/2014 | Kang | G06K 9/2018 382/103 |
| 2015/0055085 A1* | 2/2015 | Fonte | G06F 30/00 351/178 |
| 2015/0213600 A1* | 7/2015 | Kyriakou | G06T 15/08 345/424 |
| 2015/0381968 A1* | 12/2015 | Arora | G06T 17/00 348/47 |
| 2017/0019633 A1* | 1/2017 | Shaburov | H04N 7/157 |
| 2017/0161905 A1* | 6/2017 | Reyzin | G06T 7/194 |
| 2017/0278289 A1* | 9/2017 | Marino | G06Q 30/0276 |
| 2018/0197339 A1* | 7/2018 | Puvvada Sathyanarayana | G06T 19/006 |
| 2018/0286130 A1* | 10/2018 | Lee | G06T 7/194 |
| 2018/0365853 A1* | 12/2018 | Yang | G06T 7/75 |
| 2019/0035149 A1* | 1/2019 | Chen | G06T 13/40 |

* cited by examiner

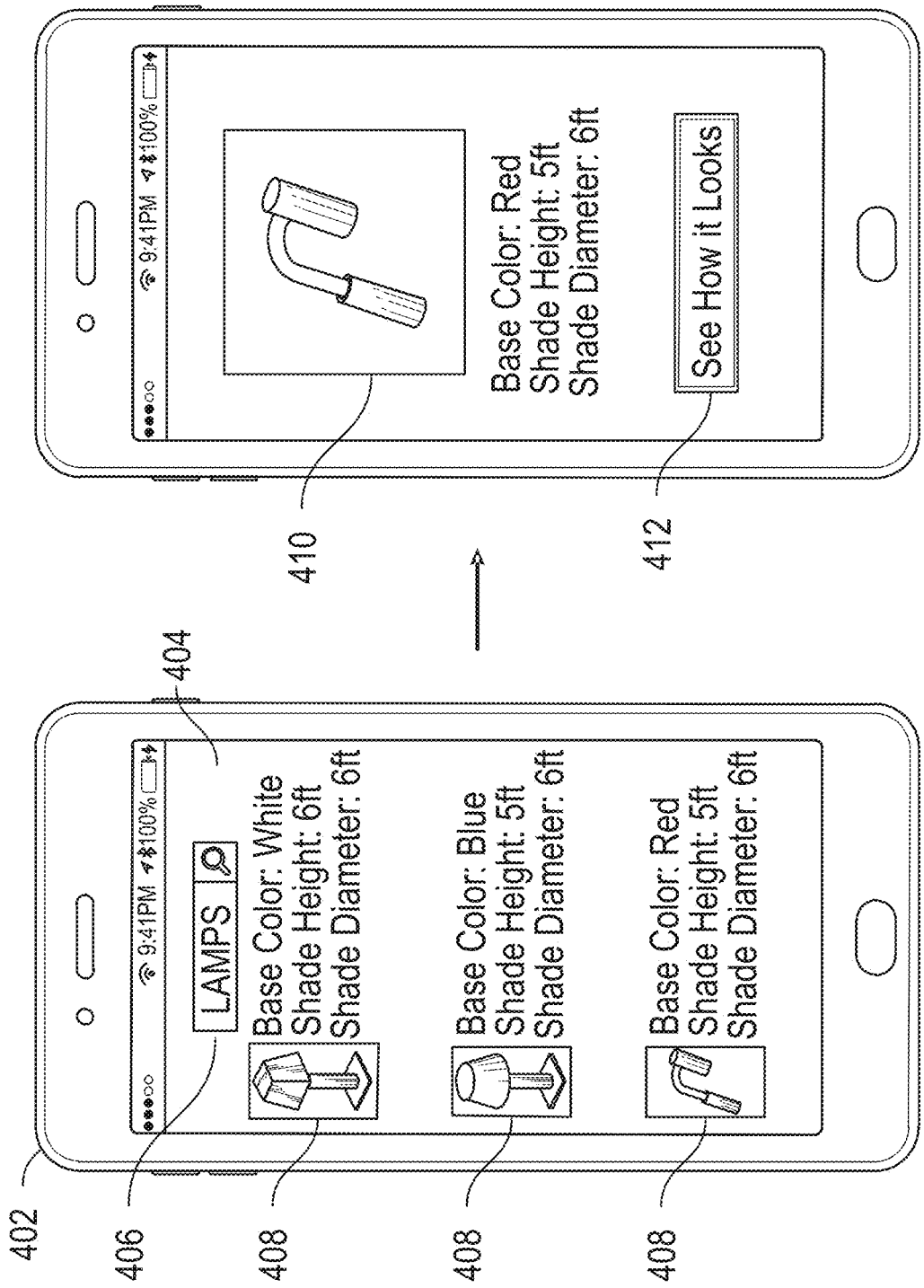

RENDERING THREE-DIMENSIONAL MODELS ON MOBILE DEVICES

Users are increasingly purchasing items over the Internet. Accordingly, when a customer receives delivery of an item, it may be the first time he or she has viewed the item in person. The item may not look the same way the customer envisioned based on photographs viewed online. For example, a customer may order a lamp to place on an end table, but when the ordered lamp is physically placed on the table, the customer might not be pleased with its size or style, particularly relative to other items in the room. Providing an accurate rendering of the object may help with the ordering process.

BRIEF DESCRIPTION OF THE DRAWINGS

Various embodiments in accordance with the present disclosure will be described with reference to the drawings, in which:

FIGS. 4A-B illustrate an example user interface in accordance with various embodiments.

DETAILED DESCRIPTION

Figure 1A:
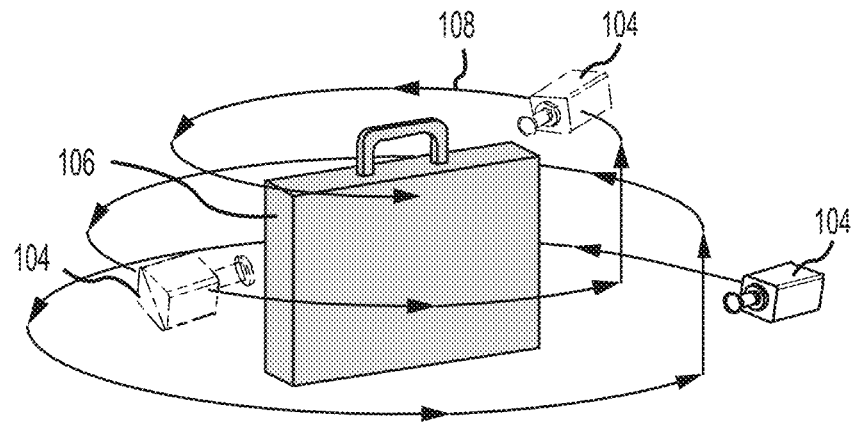
FIGS. 1A-B illustrate an example virtual image capture system in accordance with various embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Approaches described and suggested herein relate to generating simplified three-dimensional representations of objects to be used, for example, on mobile devices. In embodiments, a complex, three-dimensional virtual representation of an object can be rendered based, for instance, on a CAD file. This representation may not be optimized for mobile viewing due to the amount of information represented. In embodiments, virtual images are captured from a plurality of views around the three-dimensional virtual representation of the object. These captured views can represent multiple views from a hemisphere about the object in embodiments. These virtual images each portray a two-dimensional view of the complex three-dimensional virtual representation of the object.

A simplified three-dimensional representation of the object can be created using the plurality of virtual images. For example, each virtual image can be converted into a binary mask. The binary mask can represent the virtual image in terms of pixels that are associated with the object and pixels that are not associated with the object. For instance, pixels associated with the object can be white in the binary mask and pixels not associated with the object can be black. Because the virtual images are captured from a provided object representation, which has known dimensions, then the binary mask can distinguish between object and non-object pixels with certainty or very high confidence.

The simplified three-dimensional representation of the object can take the form of an object mesh structure, which can be created from the virtual images. The object mesh structure represents the three-dimensional shape of the object and is overlaid by a mesh. The object mesh structure can be created by carving away the two-dimensional non-object portions for each binary mask from a three-dimensional object environment. This leaves an object mesh structure depicting the three-dimensional shape of the object. Other methods can also be used to create the object mesh structure.

In embodiments, the object mesh structure has a significantly lower level of complexity than the initial three-dimensional virtual representation of the object that was rendered. Accordingly, the object mesh structure can be better optimized for mobile device viewing. The object mesh structure and virtual images can be packaged and provided to a mobile device. When the object mesh structure is viewed from a given angle, the appropriate virtual image can overlay the object mesh structure, such that a user of the mobile device can view a photorealistic representation of the object in question.

Various other such functions can be used as well within the scope of the various embodiments as would be apparent to one of ordinary skill in the art in light of the teachings and suggestions contained herein.

As described, various embodiments provide for the creation and rendering of simplified three-dimensional object representations. A virtual image capture system to obtain virtual images of objects is illustrated in FIG. 1A. In the example shown in FIG. 1A, a virtual camera 104 captures a number of virtual images of a three-dimensional virtual representation of an object 106. In other words, information describing an object, such as a CAD file or other engineering specifications for example, can be provided. The object can then be rendered virtually in three dimensions. Then a virtual camera 104 can capture a plurality of virtual images of the three-dimensional virtual representation of the object 106. In embodiments, the virtual camera 104 moves around the three-dimensional virtual representation of the object 106 in a predefined virtual camera path 108. The virtual camera path 108 can be configured to allow the virtual camera 104 to view the three-dimensional virtual representation of the object 106 from a plurality of views. In embodiments, the virtual camera 104 can capture a virtual image at over a thousand locations along the virtual camera path 108.

Figure 1B:
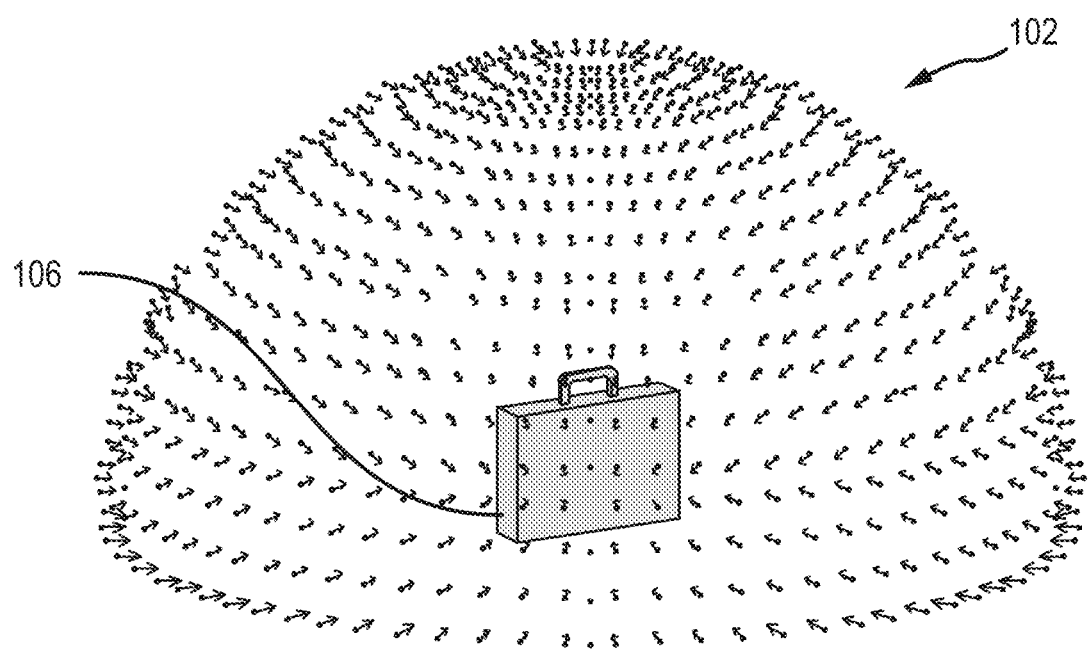

For example, as illustrated in FIG. 1B, the virtual camera can capture views corresponding to the illustrated hemisphere 102 about the three-dimensional virtual representation of the object 106. In embodiments, the number of virtual images can correspond to what would be captured from a physical camera array in which, for instance, 19 cameras capture an actual image at each of 72 locations per camera. This would result in 1,368 object images. Likewise, the virtual camera path can be configured to capture 1,368 virtual images, one corresponding to each actual image that could be captured in the above-described physical camera array. The "density" of this viewpoint hemisphere 102, or total number of viewpoints contained, depends on the number of virtual images captures.

When a virtual image is captured, pose information can be recorded as well. The pose information indicates the angle at which a particular virtual image was captured. To record pose information, a coordinate system can be anchored on the three-dimensional virtual representation of the object. That is, the origin of a three-dimensional coordinate system can be located on the virtual representation of the object. The angle information recorded for a virtual image indicates (i) where the virtual camera was located in the coordinate system at the time of capture, and (ii) how the virtual camera was oriented with respect to the virtual representation of the object at the time of capture. The rays representing the various viewpoints in FIG. 1B provide an example illustration of poses, with each point representing a virtual camera location and each arrow representing a virtual camera orientation. Each component of the pose—the virtual camera location and the virtual camera orientation—can be represented by three degrees of freedom within the coordinate system, such that each pose is defined by six degrees of freedom. Three degrees of freedom provide the virtual camera location and another three degrees of freedom indicate the direction in which the virtual camera was pointing during virtual image capture. Virtual camera intrinsics can also be recorded. This information can include the focal lengths and principal point for each virtual camera. The virtual camera intrinsics can also be used during rendering.

In embodiments, the pose information can be defined with respect to a coordinate system anchored to a point with respect to the virtual representation of the object. For example, a coordinate system can be anchored to the bottom center of the virtual representation of the object. That is, the bottom center of the virtual representation of the object can be the origin of the coordinate system. In embodiments, the coordinate system can be anchored to the center of a cross section at the midpoint of the virtual representation of the object's height, which would correspond to the center of the virtual representation of the object. In embodiments, rather than using a global anchor system, specific points on the virtual representation of the object can be used.

Figure 2A:
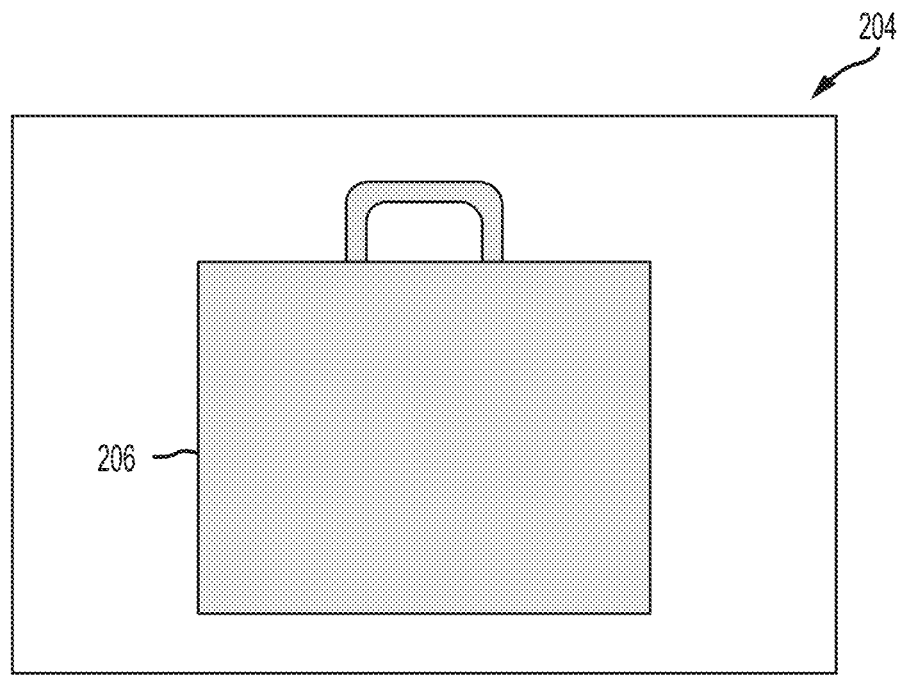
FIGS. 2A-B illustrate an example object and binary image in accordance with various embodiments.
Figure 2B:
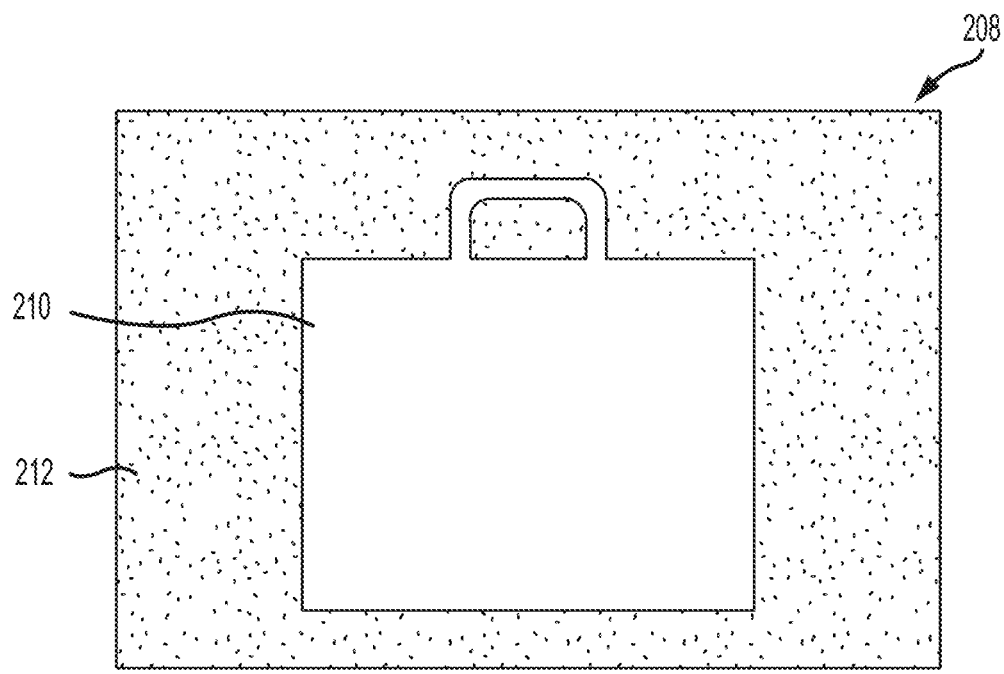

FIGS. 2A-B illustrate an example of a virtual image 204 and binary mask 208. As described above, embodiments include capturing a plurality of virtual images representing a plurality of views of the virtual representation of the object. For example, 1,368 views can be represented by capturing 1,368 virtual images about the object. An object mesh structure can be created using the virtual images. For example, each virtual image 204 can show a two-dimensional object representation 206. That is, the virtual image 204 shows the three-dimensional representation of the object from a particular view. In embodiments, each virtual image 204 is converted into a binary mask 208. A binary mask 208 can indicate whether individual pixels from the virtual image 204 are associated with the virtual representation of the object or associated with the background.

In embodiments, multiple virtual images can be created for each captured view. For example, different virtual images can be created to simulate different lighting conditions. Put another way, different versions of the same virtual image can portray the same view but with varied lighting. These versions can, for instance, portray a strong directional light originating from various directions. In embodiments, different versions can be created to show the same view from near darkness on one end of a spectrum to fully illuminated on the other end of the spectrum. In embodiments, a canonical set of virtual images can be created for each captured view such that each view includes virtual images under, for instance, three, four, or more lighting conditions. In embodiments, a set of canonical lighting conditions can be created and then different versions of a virtual image can be rendered on the fly on a mobile device with the appropriate conditions. The use of different lighting conditions allows the final object rendered on the mobile device to appear more realistically as part of the environment, for instance in an augmented reality application. This is because the environments used in an augmented reality application may be of varying lighting conditions. Accordingly, a user who wants to view a representation of a rendered object in a dark room will be able to view a more heavily shadowed version of the rendered object as opposed to, for example, the highly illuminated version of the same object that another user may see after rendering the object in a well lit room.

FIG. 2B illustrates a binary mask 208 created from the virtual image 204 of FIG. 2A. In this example, object regions 210 are shown in white and non-object regions 212 are shaded. In various implementations, more than two pixel values can be used to show the degree of confidence with which it can be said that a pixel belongs to an object. However, because the virtual representation of the object is rendered with known dimensions, it can effectively be determined with certainty which pixels in the virtual images are object pixels and which are non-object pixels. Therefore, binary masks can be used to definitely distinguish between the two types of pixels. Each mask can be thought of as indicating the area occupied by the virtual representation of the object for the particular two-dimensional view shown. Collectively, the binary masks can be used to generate an object mesh structure.

Figure 3A:
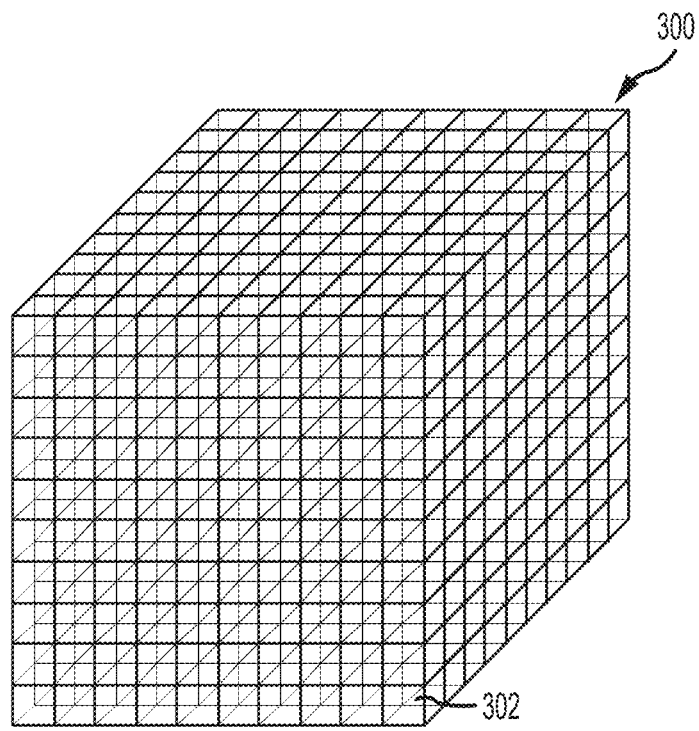
FIGS. 3A-C illustrate an example three-dimensional object environment, an example pared down three-dimensional object environment, and an object mesh structure in accordance with various embodiments.
Figure 3B:
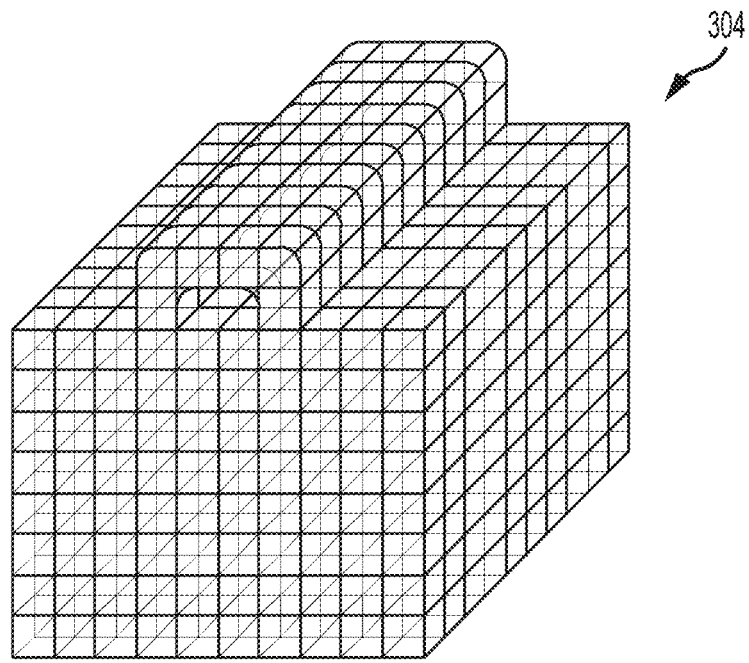
Figure 3C:
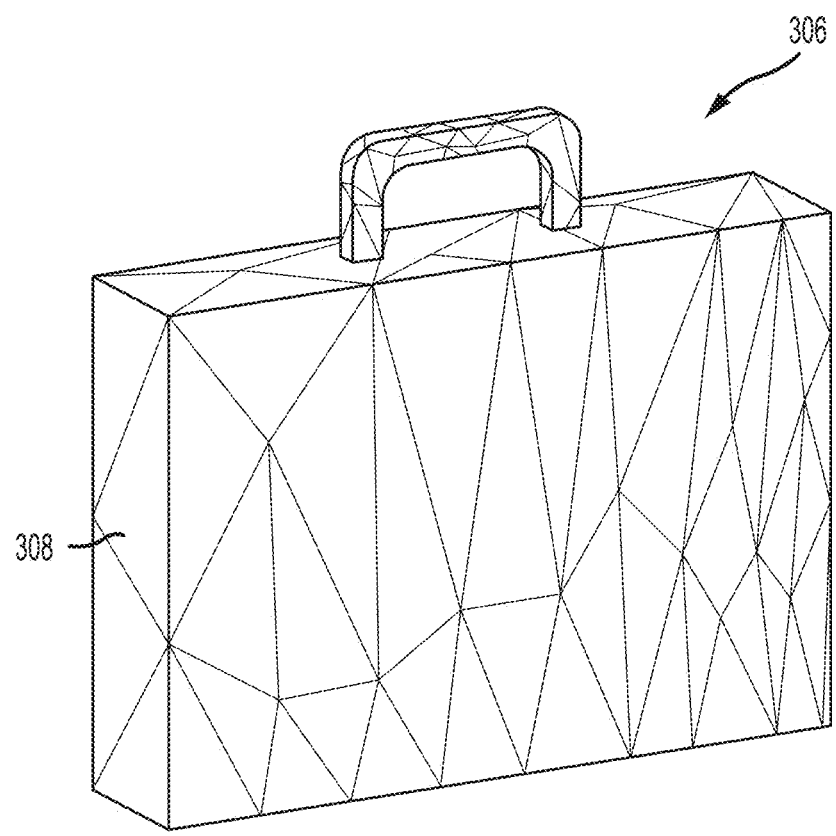

As illustrated in FIGS. 3A-C, in embodiments, the object mesh structure is created by first determining a three-dimensional object environment 300 and subtracting the non-object area of each binary mask from that object environment. In other words, the two-dimensional non-object area is carved away from a three-dimensional object environment 300 for each view, which leaves a three-dimensional representation of the object. The three-dimensional object environment 300 can be composed of discrete units 302, such as voxels. When the non-object units 302 are carved away for a particular binary mask, such as the binary mask 208 of FIG. 2B, then the three-dimensional object environment 300 loses all units 302 known from that binary mask 208 not to be part of the object. FIG. 3B illustrates a pared down object environment 304 in which the discrete units known not to belong to the object have been removed based on the binary mask 208 created from one virtual image representing one view of the object. When this is repeated for multiple binary masks representing multiple views, the three-dimensional object environment 300 is pared down further, eventually leaving a three-dimensional hull corresponding to the shape of the virtual representation of the object. As illustrated in FIG. 3C, this can result in an object mesh structure 306, which represents the shape of the virtual representation of the object and includes an overlaid mesh. The overlaid mesh includes mesh elements 308, such as mesh triangles or other mesh polygons.

The object mesh structure 306 can be sent to a client device along with the virtual images and binary masks. Additional information can be sent as well, including metadata such as the pose information described above. As discussed below, the object mesh structure can be overlaid by the virtual images or synthetic images based on the virtual images. The overlaid object mesh structure can be manipulated on a mobile device, which can cause dynamic changes to the image overlaying the object mesh structure.

FIGS. 4A-B illustrate an example user interface 404 that can be used to implement various embodiments. Embodiments can be implemented in the context of an electronic marketplace. The electronic marketplace can offer various items for sale to users who access the electronic marketplace, for example through a dedicated application. The application 404 can run on a mobile device 402 or other computing system. Embodiments can receive input of search parameters through a search field 406. FIGS. 4A-B illustrates a particular example in which the user searches for lamps. Other items offered by the electronic marketplace can be searched for as well. When a user searches "Lamps," for example, various lamps 408 can be presented to the user. FIG. 4B illustrates an example user interface that can be displayed in response to an item selection. The user can be shown a page with additional details about the user's selected lamp 410. A "See How It Looks" selection 412 or similar prompt can be presented to a user. When selected, the user can interact with a rendering of the selected lamp 410. In embodiments, the "See How It Looks" selection 412 or similar prompt activates an augmented reality environment to view and interact with the desired object in the context of a user's physical environment. The object mesh structure, virtual images, and binary masks can be provided to the client device accordingly. It may be desirable for the user to interact with a photorealistic representation of the selected object, particularly in the context of the actual physical environment.

Figure 5:
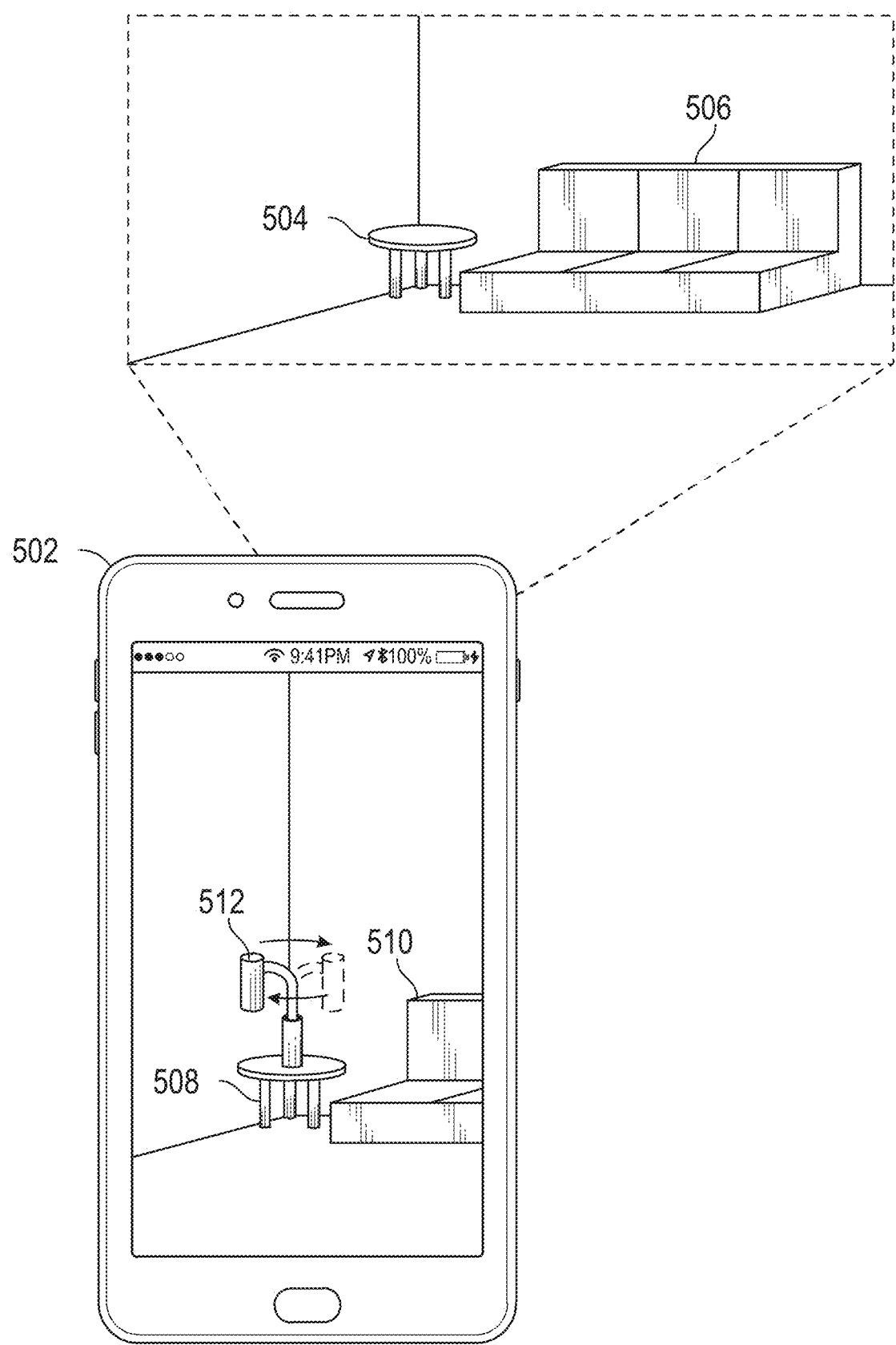
FIG. 5 illustrates an example user interface in accordance with various embodiments.

FIG. 5 illustrates an example of a user interacting with a selected item through an augmented reality setting. Continuing the above example, the selected lamp 510 can be viewed in a user's home so she can get a sense of how the lamp would actually look where she had planned to place it. For example, a user may plan to place the selected lamp 510 in her living room on an end table 504 next to her couch 506. The user can point the camera of her mobile device 502 at the end table 504. Through the mobile device's display, the user can view a representation of the lamp 512 placed on top of the end table 508. When viewing the representation of the lamp 512 through her mobile device's display, the user can compare it to the color of the couch 510 or the height of the end table 508 to name two examples. The user can also rotate the representation of the lamp 512 or move it around on the end table. This way, the user can understand how various items would look in her apartment before purchasing them. The lamp 512 can be represented in three dimensions by the object mesh structure described above. The object mesh structure is overlaid by the appropriate virtual image or a synthetic image that is a weighted blend of two or more captured virtual images. Therefore, the user views a three-dimensional structure where the structure is overlaid by a virtual image captured from a virtual representation of the object.

Figure 6:
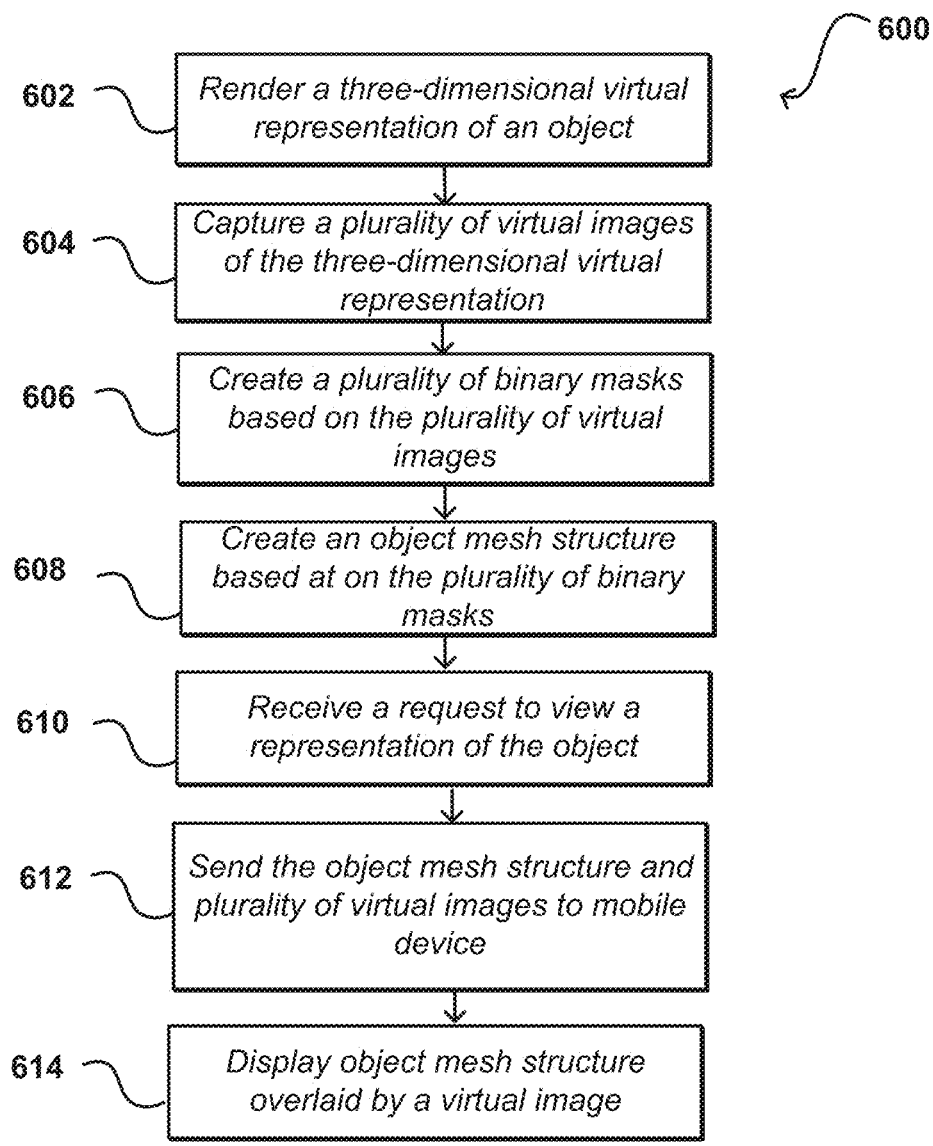
FIG. 6 illustrates an example method in accordance with various embodiments.

FIG. 6 illustrates an example method 600 according to embodiments. As discussed above, a three-dimensional virtual representation of an object can be rendered 602. This three-dimensional virtual representation may be of high complexity. For example, it may be based on the engineering or manufacturing specifications of the object. Much of the information needed to manufacture the object may not necessarily be needed to create a photorealistic rendering of the object for purposes of use on a mobile device, and the extra information may result in a payload that larger than necessary. Accordingly, a simplified model can be created with less information about the object. This simplified model can consequently be transferred to the mobile device more quickly and it can be rendered on the mobile device more fluidly.

One step toward creating a lower complexity model can include capturing a plurality of virtual images of the three-dimensional virtual representation of the object 604. The virtual images portray the virtual representation of the object from a respective plurality of views. The virtual images can be used to create a plurality of binary masks 606. The binary masks can visually depict which pixels of the virtual images are associated with the representation of the object and which are not. For example, object pixels can be white and non-object pixels can be black. Accordingly, the binary masks can distinguish between regions associated with the object and regions not associated with the object.

The binary masks can be used to create an object mesh structure 608. In embodiments, a three-dimensional object environment is first determined, for example comprising voxels or other discrete units of volume. The binary masks can be used to remove non-object volume from the three-dimensional object environment because the non-object area of each binary mask indicates the absence of the object from the corresponding volume in the three-dimensional object environment. The plurality of binary masks together can be used to carve away non-object volume for each of the plurality of views, which results in a structure that corresponds to the three-dimensional shape of the object. This structure, however, will be of a lower payload than the original three-dimensional virtual representation of the object. It will portray the object in three dimensions, but not necessarily down to the manufacturing level of detail.

Accordingly, this structure may be more suitable for rendering on a mobile device. A request to view a representation of the object on a mobile device can be received 610. For instance, a user of an augmented reality application as described above may wish to view a representation of an object overlaying the user's physical environment. The object mesh structure, which can include mesh polygons such as triangles, can be sent to the mobile device along with the plurality of virtual images 612. In embodiments, the plurality of binary masks can be sent to the mobile device as well. The object mesh structure can then be displayed on the mobile device overlaid by the appropriate virtual image 614. The overlaid virtual image can change dynamically as the object mesh structure is rotated. For instance, a user can rotate the object mesh structure by a certain amount. The virtual image corresponding to the new view can be substituted in for the virtual image corresponding to the previous view.

In embodiments, the representation of the object may be rotated to a view that does not exactly correspond to one of the captured views. In other words, there may not be a virtual image that corresponds perfectly to the requested view. In embodiments, a synthetic image can be created based on a subset of the plurality of virtual images. For instance, a synthetic image can be created as a weighted blend of two, three, four, or more of the virtual images captured. A synthetic image can be used in any instance in which a user requests to view the object from an arbitrary view that differs from a captured view.

For example, the arbitrary view can be at a different depth than the captured views. It can also be oriented at a different angle than the captured views. Furthermore, it can be centered at a different spot on the virtual representation of the object than the captured views. For these reasons, among others, the captured views do not exactly correspond to the arbitrary view. Therefore, a single virtual image may not show the area sought to be portrayed from the arbitrary view. However, a subset of the plurality of virtual views, for instance a subset of three or four total virtual views, can be used to create a synthetic image. The synthetic image is a rendering of what the virtual camera would have captured if it had been placed at the same virtual location as the arbitrary view. The blending to form a synthetic image can occur while a view is being rendered onto the object mesh structure.

Figure 7:
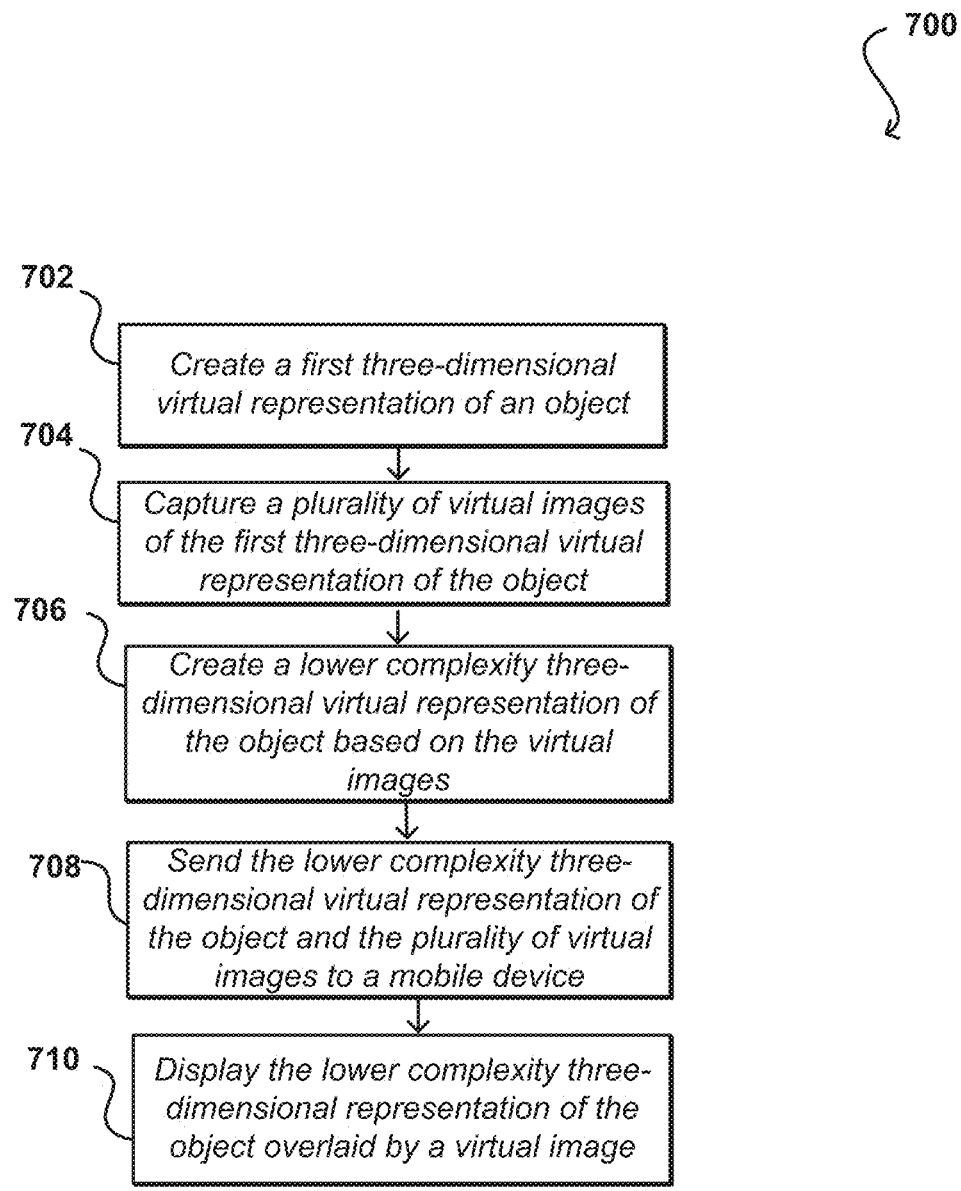
FIG. 7 illustrates an example method in accordance with various embodiments.

FIG. 7 illustrates another example method according to various embodiments. As discussed above, a first three-dimensional virtual representation of an object can be created 702. In embodiments, this first virtual representation includes significant detail about the object that is not necessarily required for a photorealistic rendering of the object. A plurality of virtual images of the first three-dimensional virtual representation of the object can then be captured 704. These virtual images can be used to create a lower complexity three-dimensional virtual representation of the object 706. The lower complexity three-dimensional virtual representation of the object can be sent to a mobile device along with the plurality of virtual images 708. Because the lower complexity three-dimensional virtual representation includes less information about the object, it can be described with less data, which may be more optimal for transfer to and rendering on a mobile device. The lower complexity three-dimensional virtual representation of the object can be displayed on the mobile device display overlaid by the appropriate virtual image.

Figure 8:
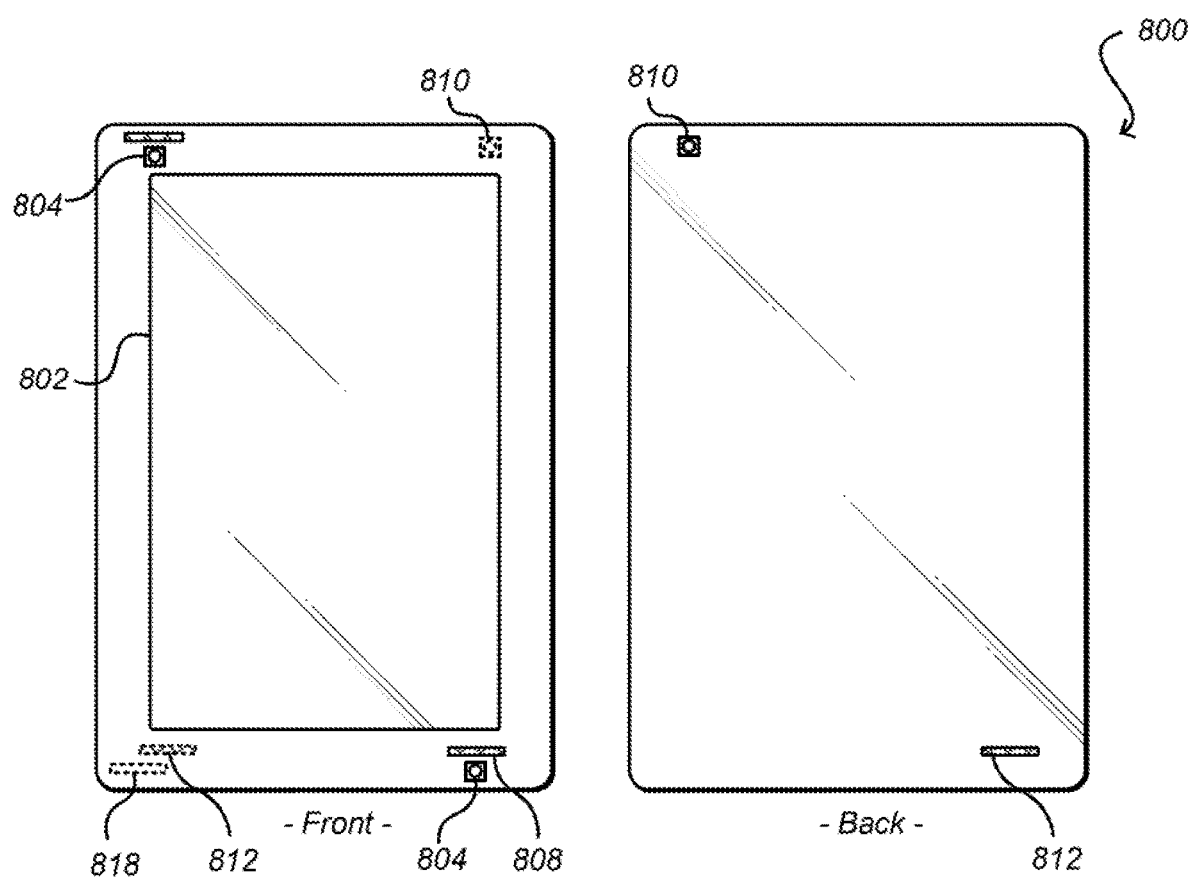
FIG. 8 illustrates an example computing device in accordance with various embodiments.
Figure 9:
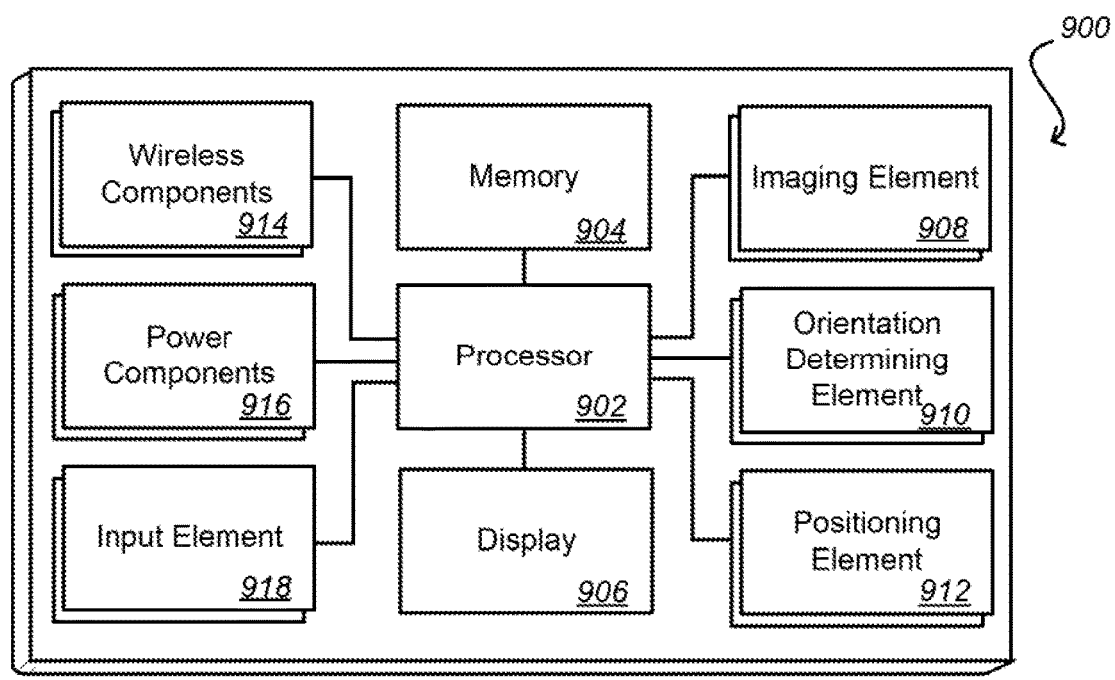
FIG. 9 illustrates a set of example components of one or more devices of the present disclosure in accordance with various embodiments.

FIG. 8 illustrates a set of components of an example computing device 800 that can be utilized to implement aspects of the various embodiments. FIG. 9 illustrates a set of components of an example computing device 900 that can be used to implement aspects of various embodiments. The device 800, 900 can include at least one processor 902 for executing instructions that can be stored in a memory device or element 904. As would be apparent to one of ordinary skill in the art, the device can include many types of memory, data storage or computer-readable media, such as a first data storage for program instructions for execution by the at least one processor 902, the same or separate storage can be used for images or data, a removable memory can be available for sharing information with other devices, and any number of communication approaches can be available for sharing with other devices. The device may include at least one type of display element 802, such as a touch screen, electronic ink (e-ink), organic light emitting diode (OLED) or liquid crystal display (LCD), although devices such as servers might convey information via other means, such as through a system of lights and data transmissions. The device typically will include one or more networking components, such as a port, network interface card, or wireless transceiver that enables communication over at least one network. The device can include at least one input device able to receive conventional input from a user. This conventional input can include, for example, a push button, touch pad, touch screen, wheel, joystick, keyboard, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual and audio commands such that a user can control the device without having to be in contact with the device.

The device 800, 900 can include one or more imaging elements 810, 908. One or more orientation determining elements 910 can determine the orientation of the device, for example in relation to a user's face or eyes. Various camera-based and other sensors 804, 808, 812, 818 can be used to determine orientation. A positioning element 912 can determine the position of the device. The positioning element 912 can use one or more of GPS, local network detection, Bluetooth connection, or other protocols. One or more input elements 910 can register user input, for example input received from a touch screen display. An example device 800, 900 will also include power components 916 and wireless components 914 to communicate with other devices wirelessly.

As discussed, different approaches can be implemented in various environments in accordance with the described embodiments. As will be appreciated, although a Web-based environment is used for purposes of explanation in several examples presented herein, different environments may be used, as appropriate, to implement various embodiments. The system includes an electronic client device, which can include any appropriate device operable to send and receive requests, messages or information over an appropriate network and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server for receiving requests and serving content in response thereto, although for other networks, an alternative device serving a similar purpose could be used, as would be apparent to one of ordinary skill in the art.

Figure 10:
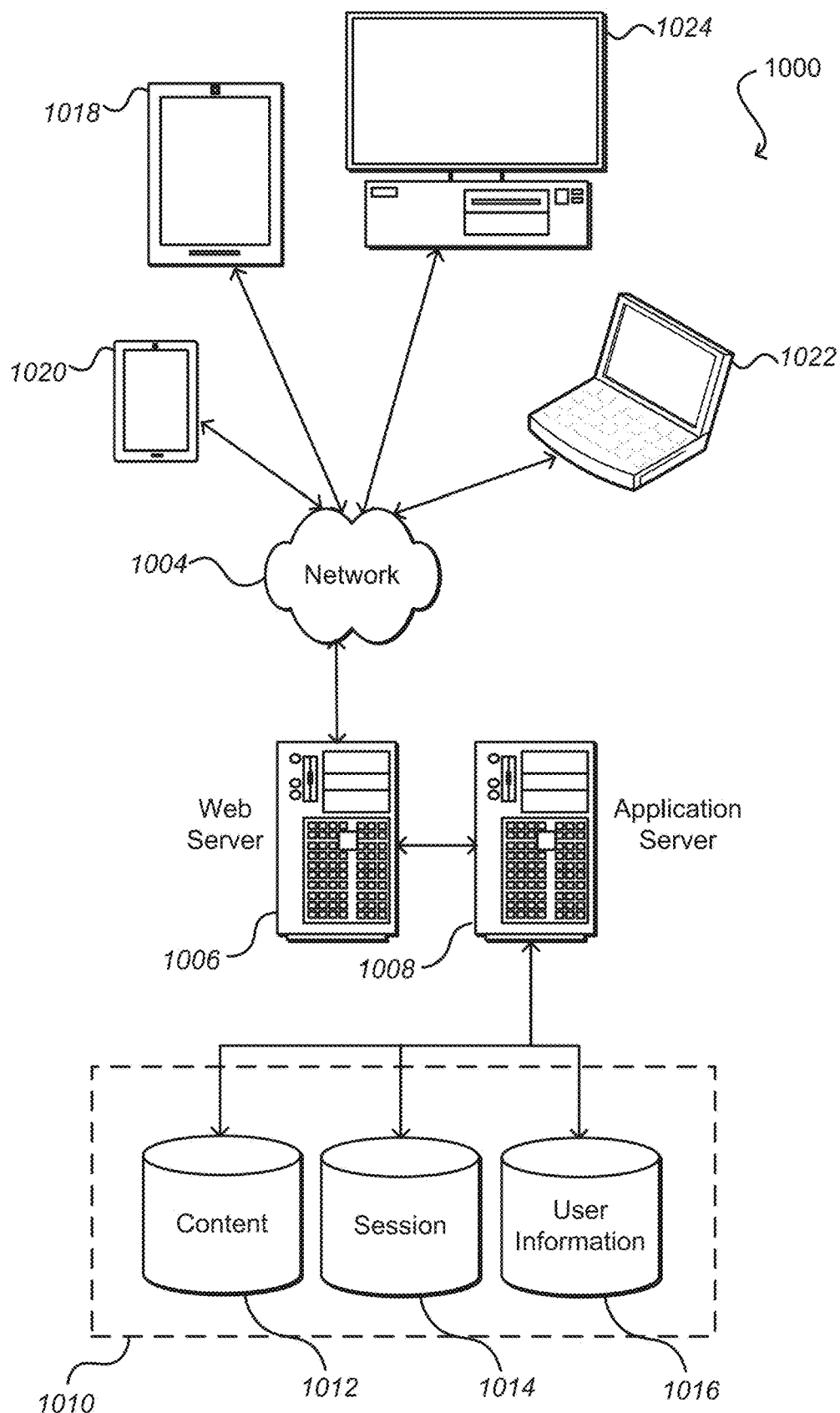
FIG. 10 illustrates an example computing environment that can be used to implement aspects of various embodiments.

FIG. 10 is an example of an illustrative environment 1000 in which embodiments can be implemented. The illustrative environment 1000 includes at least one application server 1008 and a data store 1010. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 1008 can include any appropriate hardware and software for integrating with the data store as needed to execute aspects of one or more applications for the client device and handling a majority of the data access and business logic for an application. The application server 1008 provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device and the application server, can be handled by the Web server 1006. It should be understood that the Web server 1006 and application servers 1008 are merely example components, as structured code discussed herein can be executed on any appropriate device or host machine as discussed elsewhere herein.

The data store 1010 can include several separate data tables, databases or other data storage mechanisms and media for storing data relating to a particular aspect. For example, the data store 1010 illustrated includes mechanisms for storing content 1012 (e.g., production data) and user information 1016, which can be used to serve content for the production side. The data store is also shown to include a mechanism for storing log or session data 1014. It should be understood that there can be many other aspects that may need to be stored in the data store, such as page image information and access rights information, which can be stored in any of the above listed mechanisms as appropriate or in additional mechanisms in the data store. The data store 1010 is operable, through logic associated therewith, to receive instructions from the application server and obtain, update or otherwise process data in response thereto. In one example, a user might submit a search request for a certain type of item. In this case, the data store 1010 might access the user information to verify the identity of the user and can access the catalog detail information to obtain information about items of that type. The information can then be returned to the user, such as in a results listing on a Web page that the user is able to view via a browser on the user device. Information for a particular item of interest can be viewed in a dedicated page or window of the browser.

Each server 1006, 1008 typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment 1000 in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated. Thus, the depiction of the systems herein should be taken as being illustrative in nature and not limiting to the scope of the disclosure.

The various embodiments can be further implemented in a wide variety of operating environments, which in some cases can include one or more user computers or computing devices 1018, 1020, 1022, 1024 which can be used to operate any of a number of applications. User or client devices 1018, 1020, 1022, 1024 can include any of a number of general purpose personal computers, such as desktop 1024 or laptop computers 1022 running a standard operating system, as well as cellular, wireless and handheld devices 1018, 1020 running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network 1004 that would be familiar to those skilled in the art for supporting communications using any of a variety of commercially-available protocols, such as TCP/IP, FTP, UPnP, NFS, and CIFS. The network 1004 can be, for example, a local area network, a wide-area network, a virtual private network, the Internet, an intranet, an extranet, a public switched telephone network, an infrared network, a wireless network and any combination thereof.

In embodiments utilizing a Web server 1006, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment 1000 can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, magnetic tape drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
    under the control of one or more computer systems configured with executable instructions,
    rendering a three-dimensional virtual representation of an object;
    capturing a plurality of virtual images of the three-dimensional virtual representation of the object, the plurality of virtual images portraying the three-dimensional virtual representation of the object from a respective plurality of captured views;
    creating a plurality of binary masks based at least in part on the plurality of virtual images, a binary mask indicating whether individual pixels are associated with the three-dimensional virtual representation of the object;
    creating an object mesh structure based at least in part on the plurality of binary masks, the object mesh structure portraying the object in three dimensions with an overlaid mesh and having a lower level of complexity than the three-dimensional virtual representation of the object;
    receiving a request to view a representation of the object on a mobile device;
    sending, to the mobile device, the object mesh structure and the plurality of virtual images; and
    displaying, on a display of the mobile device, the object mesh structure overlaid by a virtual image of the plurality of virtual images.

2. The computer-implemented method of claim 1, further comprising:
    receiving a request to view the representation of the object from an arbitrary view, the arbitrary view differing from the plurality of captured views; and
    rendering a synthetic image onto the object mesh structure by blending a subset of the plurality of virtual images, the synthetic image portraying the representation of the object from the arbitrary view.

3. The computer-implemented method of claim 1, further comprising:
    capturing an actual mobile device environment through an image capture element of the mobile device; and
    overlaying the object mesh structure on the actual mobile device environment on the display of the mobile device.

4. The computer-implemented method of claim 1, wherein creating the object mesh structure based at least in part on the plurality of binary masks comprises:
    determining, for individual binary masks of the plurality of binary masks, an area not associated with the three-dimensional virtual representation of the object;
    determining a three-dimensional object environment; and
    subtracting, from the three-dimensional object environment, the area in the individual binary masks not associated with the three-dimensional virtual representation of the object.

5. The computer-implemented method of claim 1, wherein the plurality of virtual images are captured by a virtual camera, and wherein the plurality of virtual images include pose information and virtual camera intrinsics, the pose information comprising (i) a virtual camera location component including a three-dimensional description of a location associated with the virtual camera for individual virtual images, and (ii) a virtual camera orientation component including a three-dimensional description of an orientation for the virtual camera for individual virtual images, the virtual camera intrinsics comprising a focal length and a principal point of the virtual camera for individual virtual images.

6. A computer-implemented method, comprising:
    under the control of one or more computer systems configured with executable instructions, creating a first three-dimensional virtual representation of an object;
    capturing a plurality of virtual images of the first three-dimensional virtual representation of the object, the plurality of virtual images portraying the first three-dimensional virtual representation of the object from a respective plurality of captured views;
    creating a plurality of binary masks based at least in part on the plurality of virtual images, a binary mask of the plurality of binary masks indicating whether individual pixels are associated with the first three-dimensional virtual representation of the object;
    creating a second three-dimensional virtual representation of the object based at least in part on the plurality of virtual images, the second three-dimensional virtual representation of the object having a lower level of complexity than the first three-dimensional virtual representation of the object, creating the second three-dimensional virtual representation of the object including using the plurality of binary masks to create an object mesh structure representing the object in three dimensions; and
    providing, for display on a mobile device, a virtual image of the plurality of virtual images overlaying the second three-dimensional virtual representation of the object.

7. The computer-implemented method of claim 6, further comprising:
   receiving a request to view a representation of the object on the mobile device.

8. The computer-implemented method of claim 7, the method further comprising:
   creating a set of versions of a virtual image based on a respective set of canonical lighting conditions;
   determining local lighting conditions for the mobile device; and
   displaying, based on the local lighting conditions, a particular version of the virtual image from the set of versions of the virtual image.

9. The computer-implemented method of claim 6, further comprising:
   receiving a request to view the representation of the object from an arbitrary view, the arbitrary view differing from the plurality of captured views; and
   rendering a synthetic image onto the object mesh structure by blending a subset of the plurality of virtual images, the synthetic image portraying the representation of the object from the arbitrary view.

10. The computer-implemented method of claim 9, wherein the subset of the plurality of virtual images is blended as a weighted composite of virtual images in the subset, and wherein weights for individual virtual images in the subset of the plurality of virtual images are determined at least in part based on a cosine of the angle between individual captured views corresponding to the respective subset of the plurality of virtual images and the arbitrary view requested.

11. The computer-implemented method of claim 6, wherein the plurality of virtual images are captured by a virtual camera, the method further comprising:
   determining a focal length and a principal point of the virtual camera for individual virtual images.

12. A system, comprising: at least one processor; memory including instructions that, when executed by the at least one processor, cause the system to: create a first three-dimensional virtual representation of an object; capture a plurality of virtual images of the first three-dimensional virtual representation of the object, the plurality of virtual images portraying the first three-dimensional virtual representation of the object from a respective plurality of captured views;
   create a plurality of binary masks based at least in part on the plurality of virtual images, a binary mask of the plurality of binary masks indicating whether individual pixels are associated with the first three-dimensional virtual representation of the object;
   create a second three-dimensional virtual representation of the object based at least in part on the plurality of virtual images, the second three-dimensional virtual representation of the object having a lower level of complexity than the first three-dimensional virtual representation of the object, creating the second three-dimensional virtual representation of the object including using the plurality of binary masks to create an object mesh structure representing the object in three dimensions; and
   providing, for display on a mobile device, a virtual image of the plurality of virtual images overlaying the second three-dimensional virtual representation of the object.

13. The system of claim 12, wherein the memory further includes instructions that, when executed by the at least one processor, cause the system to:
   receive a request to view a representation of the object on the mobile device.

14. The system of claim 13, wherein the memory further includes instructions that, when executed by the at least one processor, cause the system to:
   receive a request to view the representation of the object from a different angle;
   determine a captured view corresponding to the different angle requested;
   rotate the second three-dimensional representation of the object to align with the captured view;
   determine a substitute virtual image corresponding to the captured view; and
   overlaying the second three-dimensional representation of the object with the substitute virtual image.

15. The system of claim 13, wherein the memory further includes instructions that, when executed by the at least one processor, cause the system to:
   receive a request to view the representation of the object from an arbitrary view, the arbitrary view differing from the plurality of captured views; and
   render a synthetic image onto the object mesh structure by blending a subset of the plurality of virtual images, the synthetic image portraying the representation of the object from the arbitrary view.

16. The system of claim 15, wherein the subset of the plurality of virtual images is blended as a weighted composite of virtual images in the subset, and wherein weights for individual virtual images in the subset of the plurality of virtual images are determined at least in part based on a cosine of the angle between individual captured views corresponding to the respective subset of the plurality of virtual images and the arbitrary view requested.

17. The system of claim 13, wherein the memory further includes instructions that, when executed by the at least one processor, cause the system to:
   capture an actual mobile device environment through an image capture element of the mobile device; and
   overlay the second three-dimensional virtual representation of the object on the actual mobile device environment on the display of the mobile device.

18. The system of claim 17, wherein the plurality of virtual images include multiple versions of a virtual image for one captured view, the multiple versions of the virtual image used to portray the second three-dimensional representation of the object under different lighting conditions in the actual mobile device environment.

19. The system of claim 12, wherein the plurality of virtual images are captured by a virtual camera, and wherein the plurality of virtual images include virtual camera intrinsics, the virtual camera intrinsics comprising a focal length and a principal point of the virtual camera for individual virtual images.

* * * * *